United States Patent
Heggeland et al.

(10) Patent No.: US 11,218,825 B2
(45) Date of Patent: Jan. 4, 2022

(54) SOUND SYSTEM FOR TUNNELS, CORRIDORS AND OTHER LONG AND NARROW CONFINED SPACES

(71) Applicant: Norphonic AS, Bønes (NO)

(72) Inventors: Terje Floor Heggeland, Kalandseidet (NO); Eugene Zaikonnikov, Nesttun (NO)

(73) Assignee: Norphonic AS, Bønes (NO)

( * ) Notice: Subject to any disclaimer, the term of this patent is extended or adjusted under 35 U.S.C. 154(b) by 111 days.

(21) Appl. No.: 16/578,087

(22) Filed: Sep. 20, 2019

(65) Prior Publication Data
US 2020/0107145 A1 Apr. 2, 2020

(30) Foreign Application Priority Data
Sep. 28, 2018 (NO) .................................. 20181266

(51) Int. Cl.
*H04R 29/00* (2006.01)
*G06F 3/16* (2006.01)
(Continued)

(52) U.S. Cl.
CPC ........... *H04R 29/002* (2013.01); *G06F 3/165* (2013.01); *G10L 25/51* (2013.01); *H04R 1/403* (2013.01); *H04R 3/12* (2013.01)

(58) Field of Classification Search
CPC ........ H04R 1/403; H04R 3/12; H04R 29/002; G06F 3/165; G10L 25/51
See application file for complete search history.

(56) References Cited

U.S. PATENT DOCUMENTS

| 2003/0128850 A1* | 7/2003 | Kimura | .................. H04R 27/00 381/82 |
| 2005/0152557 A1* | 7/2005 | Sasaki | ..................... H04S 7/302 381/58 |

(Continued)

FOREIGN PATENT DOCUMENTS

| JP | S60-102100 | 6/1985 |
| JP | 2000/194977 A2 | 7/2000 |

(Continued)

OTHER PUBLICATIONS

Machine Translation of JP2004-166106-A, Jun. 2004, pp. 1-27 (Year: 2004).*

(Continued)

*Primary Examiner* — Fan S Tsang
*Assistant Examiner* — Daniel R Sellers
(74) *Attorney, Agent, or Firm* — Kilpatrick Townsend & Stockton LLP (57) ABSTRACT

Systems and methods are provided for configuring a sound system in a confined passageway. Techniques include installing a plurality of nodes with defined identities at intervals along a confined passageway. Each node includes a microphone and two loudspeakers directed in substantially opposite directions along the confined passageway. Communication is established between each of the nodes and a control system computer. In a first set of steps that is repeated, relative positions of all nodes communicating with the control system computer may be determined. In a second set of steps that is repeated, a distance may be computed for each pair of adjacent nodes of the plurality of nodes. The technique may then include storing the relative positions of all nodes and the computed distance between all adjacent nodes in the control system computer.

7 Claims, 7 Drawing Sheets

(51) Int. Cl.
*G10L 25/51* (2013.01)
*H04R 1/40* (2006.01)
*H04R 3/12* (2006.01)

(56) References Cited

U.S. PATENT DOCUMENTS

| | | | |
|---|---|---|---|
| 2006/0177073 | A1 | 8/2006 | Isaac et al. |
| 2014/0340222 | A1* | 11/2014 | Thornton ............... H05B 47/19 |
| | | | 340/539.17 |
| 2015/0116122 | A1* | 4/2015 | Laws ....................... G08B 5/22 |
| | | | 340/815.4 |
| 2017/0048618 | A1* | 2/2017 | Shinotsuka ............. H04W 4/80 |
| 2017/0070822 | A1* | 3/2017 | Skovenborg ........... H04R 3/005 |

FOREIGN PATENT DOCUMENTS

| | | |
|---|---|---|
| JP | 2004166106 A * | 6/2004 |
| WO | 2006/129539 A1 | 12/2006 |

OTHER PUBLICATIONS

Uno Ingard: "Notes on Acoustics (passage)" in: "Notes on Acoustics (passage)", Dec. 31, 2008, XP055658857, ISBN: 978-1-934015-08-7, p. 19.
Van Wijngaarden Sander J et al.: "Auditory Evacuation Beacons", JAES, AES, 60 East 42nd Street, room 2520, New York 10165-2520, USA, vol. 53, No. 1/2, Feb. 1, 2005, pp. 44-53, XP040507479.
NO 20181266; Norwegian Search Report; dated Apr. 26, 2019.
Ambient Systems SP. Z O.O, "Safety for tunnel", press release Aug. 10, 2016, https://ambientsystem.eu/wp-content/uploads/2016/05/20160810_S4T_press-release_en.pdf.

* cited by examiner

SOUND SYSTEM FOR TUNNELS, CORRIDORS AND OTHER LONG AND NARROW CONFINED SPACES

CROSS-REFERENCES TO RELATED APPLICATIONS

This application claims priority to Norwegian Patent Application No. 20181266, filed Sep. 28, 2018. The entire contents of the foregoing patent application is incorporated herein in its entirety for all purposes.

BACKGROUND OF THE INVENTION

The present invention relates to a sound system for tunnels, corridors and other long and narrow confined spaces. In particular the invention relates to PA systems and evacuation assistance systems for tunnels, ships, buildings and other structures with long and relatively narrow passageways.

Public announcement (PA) systems for tunnels, corridors and other long and narrow rooms or passages, whether they are in buildings, below ground, on ships or part of any other type of structure, are fraught with problems related in particular to reverberation, echo, and interference between loudspeakers that are mounted at a distance from each other. These problems may become critical in emergencies where correct receipt and interpretation of information is essential in order to inform and guide people who are evacuating for example a tunnel. However, the problems are also relevant to situations that are not critical.

Currently, information helping people navigate in long corridors rely heavily on visual aids such as signs, arrows, and markings on the floor. Visual aid solutions are numerous, but they have the disadvantage of poor performance in low visibility and smoke. Audio is under-utilized. Audio assistance systems do exist but are basic public announcement (PA) systems with only minor adaptations to the specific challenges associated with long tunnels and corridors.

A PA system in a tunnel is typically implemented as a set of large, powerful ceiling-mounted horns at a substantial distance (50-120 m) apart. Horns face in one particular direction and deliver the same speech announcement throughout the whole site. The system is controlled via a centrally installed control system (typically a digital station in an equipment room) and a set of speaker amplifiers. Speaker horns are connected to it via long constant voltage cables.

This solution is prone to echo, dead zones and interference in hand-over areas between the speakers. To reduce the distortions, the installation team includes an acoustic specialist performing measurements on site. They then configure the control system to introduce delays based on the distance between every two adjacent horns. Beam shaping may also be utilized, something that will only increase the configuration requirements. The result is a time consuming and costly process and the result is often less than satisfactory.

Consequently, there is a need for improved PA and evacuation assistance systems for corridors, tunnels, passageways and other long and narrow areas that people may occupy and where it is desirable to be able to communicate using audio-based information Examples of prior art includes US 2017/0048618 A1, JPS 60-102100 A, Ambient Systems SP. Z O.O, "Safety for tunnel", press release 2016 Aug. 10, and US 2006/0177073 A1.

BRIEF SUMMARY OF THE INVENTION

In order to provide an alternative where some of the problems outlined above are eliminated or at least mitigated, a sound system has been provided. The sound system includes various aspects that relate to each other in a way that combines to bring about the required configuration, synchronization and utilization of the system.

According to a first aspect, a plurality of nodes with defined identities are installed at intervals along a confined passageway, such as a tunnel or a corridor. Each node includes a microphone and two loudspeakers directed in substantially opposite directions along the confined passageway. Communication is established between each of the nodes and a control system computer, and a selected node from the plurality of nodes is instructed to play a first test sound at a first point in time determined by the control system computer and instructing the remaining nodes to register the first test sound using their microphones. The identity of the nodes adjacent to the selected node in opposite directions along the confined passageway can now be determined based on at least one of the time of registration of the first test sound at the remaining nodes and a sound level for the registered first test sound at the remaining nodes. The steps of instructing a selected node from the plurality of nodes, to play the first test sound and determining the identity of the nodes adjacent to the selected node for a new selected node until the relative positions of all nodes communicating with the control system computer have been determined.

After the relative position of all nodes have been determined, or while the determination of the relative positions are still ongoing, a selected node from the plurality of nodes may be instructed to play a second test sound using a selected one of its two loudspeakers at a second point in time determined by the control system computer and an adjacent node in the direction of the selected loudspeaker can be instructed to register the second test sound. The second test sound includes a predefined pattern at a predetermined time subsequent to the beginning of the second test sound. This predefined pattern can be detected at a third point in time by the adjacent node instructed to register the second test sound, and based on the known start time for the second test sound—the second point in time—the time of detection of the predefined pattern—the third point in time—and the known position of the feature in the test signal relative to the beginning of the second test signal a distance between the node instructed to play the second test sound and the node instructed to register the second test sound can be determined based on the time it took for the predefined pattern to travel from the node instructed to play the second test sound to the node instructed to register the second test sound.

The step of instructing a selected node from the plurality of nodes to play the second test sound and an adjacent node to register the second test sound, the step of detecting a predefined pattern, and the step of computing a distance, can now be repeated until a distance has been determined for each pair of adjacent nodes, and the relative positions of all nodes as well as the computed distance between all adjacent nodes can be stored in the control system computer.

In some embodiments, the second test sound is the sum of two sound signals with different frequencies that do not produce a repeated pattern or that only produces a repeated pattern after a time interval considerably longer than it takes to play the second test sound and detect the predefined pattern.

In some embodiments, the confined passageway is selected from the group consisting of: a tunnel, a corridor in a building, and a corridor on a ship.

In some embodiments, the determination of relative position and the determination of distance is combined. According to these embodiments, a plurality of nodes with defined identities are installed at intervals along the confined passageway. Each node includes a microphone, and two loudspeakers directed in substantially opposite directions along the confined passageway. Communication is established between each of the nodes and a control system computer, a selected node from the plurality of nodes, is instructed to play a test sound using a selected one of its two loudspeakers at a first point in time determined by the control system computer and the remaining nodes are instructed to register the test sound, the test sound including a predefined pattern at a predetermined time subsequent to the beginning of the second test sound.

The predefined pattern is registered at a second point in time by the remaining nodes instructed to register the test sound (the ones sufficiently nearby). For each node that has registered the test sound and detected the predefined pattern, a distance between the node instructed to play the second test sound and the nodes instructed to register the test sound, is computed based on the time it took for the predefined pattern to travel from the node instructed to play the test sound to the node instructed to register the test sound. The identity of the node closest to the selected node is determined based on the computed distances.

The steps of instructing a selected node from the plurality of nodes to play the test sound and the remaining nodes to register the test sound, the step of detecting a predefined pattern, the step of computing a distance, and the step of determining the identity of the node closest to the selected node are repeated until a distance has been determined for each pair of adjacent nodes, and the relative positions of all nodes and the computed distance between all adjacent nodes are stored in the control system computer.

According to a second aspect a method is provided for synchronizing a sound system in a confined passageway, the sound system comprising a plurality of nodes with defined identities installed at intervals along the confined passageway, each node including two loudspeakers directed in substantially opposite directions along the confined passageway (100), wherein for each node the identity of and distance to each adjacent node is known. For each node, a direction defined as upstream and a direction defined as downstream are defined, any node from the plurality of nodes that does not have an adjacent upstream node is instructed to start playing a sound a predetermined point in time t0. For each remaining node n a time delay Δtn relative to t0 is computed based on the distance to each downstream node from an upstream node for which a time delay has already been established, and each remaining node is instructed to start playing the sound at a point in time delayed relative to the predetermined point in time with the determined time delay Δtn using its downstream loudspeaker.

In some embodiments the downstream direction is defined as the direction towards the closest accessible exit from the confined passageway.

In some embodiments the instruction to play the sound includes an identification of an audio file stored in the nodes.

The instruction to play the sound may also include an audio file uploaded to the nodes together with the instruction.

In some embodiments, the instruction to play the sound includes streamed digital or analog audio that either arrives at each node at substantially the same time such that the determined delay Δtn relative to t0 can be achieved for all nodes, or arrives at each node with a time stamp that allows each node to buffer the streamed digital or analog audio such that the determined delay Δtn relative to t0 can be achieved for all nodes.

In some embodiments, the sound includes one or more from the group consisting of: a spoken message, a sound creating an intuitive understanding of a message, and a sound creating a psychoacoustic reaction consistent with a message.

According to yet another aspect a node for use in a sound system in a confined passageway is provided, comprising a microcontroller, a local memory, two loudspeakers directed in substantially opposite directions, a microphone, and a communication interface. The local memory includes instructions which, when executed by the microcontroller, enable the node to control playback of audio files over either one of the two loudspeakers, register sounds using the microphone, identifying predetermined patterns in registered sounds, recording points in time at which predetermined patterns are register, registering sound levels for registered sounds, calculating a distance based on two points in time and the speed of sound, receiving instructions over the communications interface to start playback of audio files at a defined point in time, start registering a received audio signal, determine points in time associated with the occurrence of an event, and perform the calculating of a distance, and uploading any result of registration and calculation to a remote control system computer.

In some embodiments, the local memory is configured to hold pre-recorded audio files including sounds selected from the group consisting of: a periodic test sound, a non-periodic test sound, a spoken message, a sound creating an intuitive understanding of a message, and a sound creating a psychoacoustic reaction consistent with a message.

BRIEF DESCRIPTION OF THE DRAWINGS

In order to facilitate understanding of the invention and explain how it may be worked in practice, non-limiting examples will be described with reference to the accompanying drawings, in which.

DETAILED DESCRIPTION OF THE INVENTION

In the following description of various embodiments, reference will be made to the drawings, in which like reference numerals denote the same or corresponding elements. The drawings are not necessarily to scale. Instead, certain features may be shown exaggerated in scale or in a somewhat simplified or schematic manner, wherein certain conventional elements may have been left out in the interest of exemplifying the principles of the invention rather than cluttering the drawings with details that do not contribute to the understanding of these principles.

It should be noted that, unless otherwise stated, different features or elements may be combined with each other whether or not they have been described together as part of the same embodiment below. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable, but for the sake of brevity, no attempt has been made to disclose a complete description of all possible permutations of features.

Furthermore, those with skill in the art will understand that the invention may be practiced without many of the details included in this detailed description. Conversely, some well-known structures or functions may not be shown or described in detail, in order to avoid unnecessarily obscuring the relevant description of the various implementations. The terminology used in the description presented below is intended to be interpreted in its broadest reasonable manner, even though it is being used in conjunction with a detailed description of certain specific implementations of the invention.

The present invention addresses the problem of delivering audio information in a narrow, confined space such as a tunnel, a corridor, a passageway, or the like. The problem is approached based on digital communication solutions and signal processing. The invention aims at the creation of a controllable audio field throughout the area in order to provide audio information that is clearly intelligible. Instead of using one, central processing and communication system and a set of a few powerful horns, the invention employs numerous, low power, digitally connected nodes with on-board autonomous computing power.

In the following description, examples are described as relating to systems installed in tunnels, but they are equally applicable to other types of narrow passages as mentioned above. For the sake of readability, this will not be repeated every time reference is made to a tunnel, but the examples should be understood in their widest reasonable sense.

Figure 1:
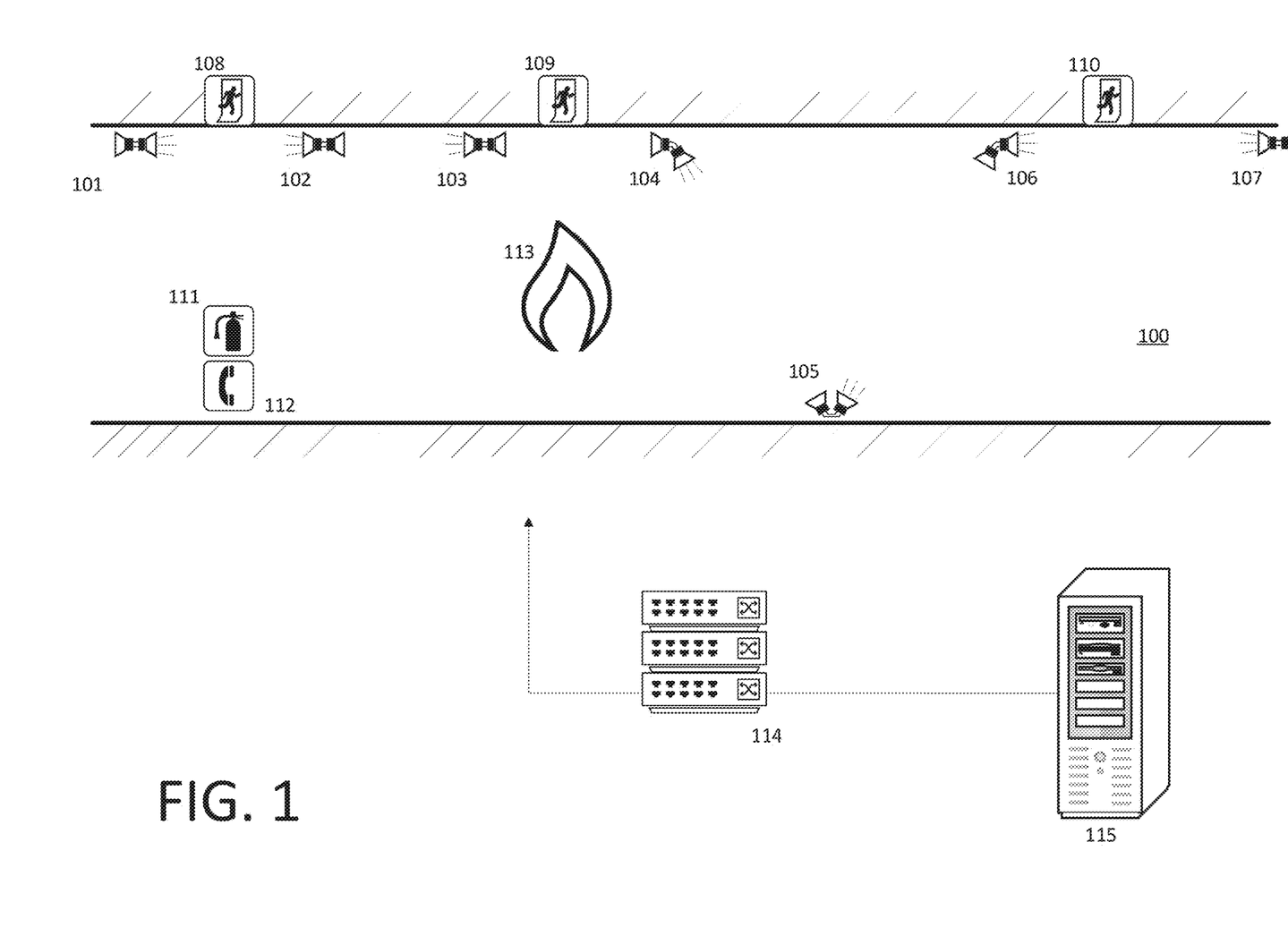
FIG. 1 is an overview of a tunnel where a system according to an embodiment of the invention has been installed.

Reference is first made to FIG. 1, which is an overview of a tunnel 100 where a system according to the invention is installed. The system includes nodes 101, 102, 103, 104, 105, 106, 107. Each node includes two speakers that are directed in opposite directions in the tunnel. The tunnel includes three emergency exits 108, 109, 110 along one tunnel wall. There are also a fire extinguisher 111 and an emergency telephone 112 in the tunnel.

The nodes are connected to one of a plurality of switches 114 and controlled by a control system 115.

The situation depicted in the drawing shows that a fire 113 has started in the middle of the tunnel 100. The fire 113 blocks exit 109 and it is desirable to provide information to people in the tunnel 100 that will guide them towards the closest exit that is not blocked. In this context the word information should be interpreted in a wide sense to include, for example, sounds that do not include any spoken language, but do include sound effects that can be interpreted intuitively as guidance towards an exit or a safe area, or sound effects that may generate psychoacoustic effects in listeners that will help them understand audible guidance. An example could be an unpleasant sound that the listener would want to move away from. In order to achieve this, the invention positions the nodes considerably closer to each other than what has been typical for tunnel PA systems. The required message or sound is played only by one of the speakers in the node, namely the speaker facing towards the closest exit. It will be noted that for nodes 101 and 107 this is the speaker facing towards the fire 113. In alternative embodiments, the direction is reversed: all speakers face away from the nearest exit and people should be moving towards the perceived source of the sound.

The system is calibrated such that the sound played by a node is delayed compared with the playback from the previous (upstream) node transmitting sound in the same direction. For example, sound played by node 102 is delayed with the amount of time it takes for the same sound played by node 103 to arrive at node 102. How the system is configured and how playback is synchronized will be described below.

Figure 2:
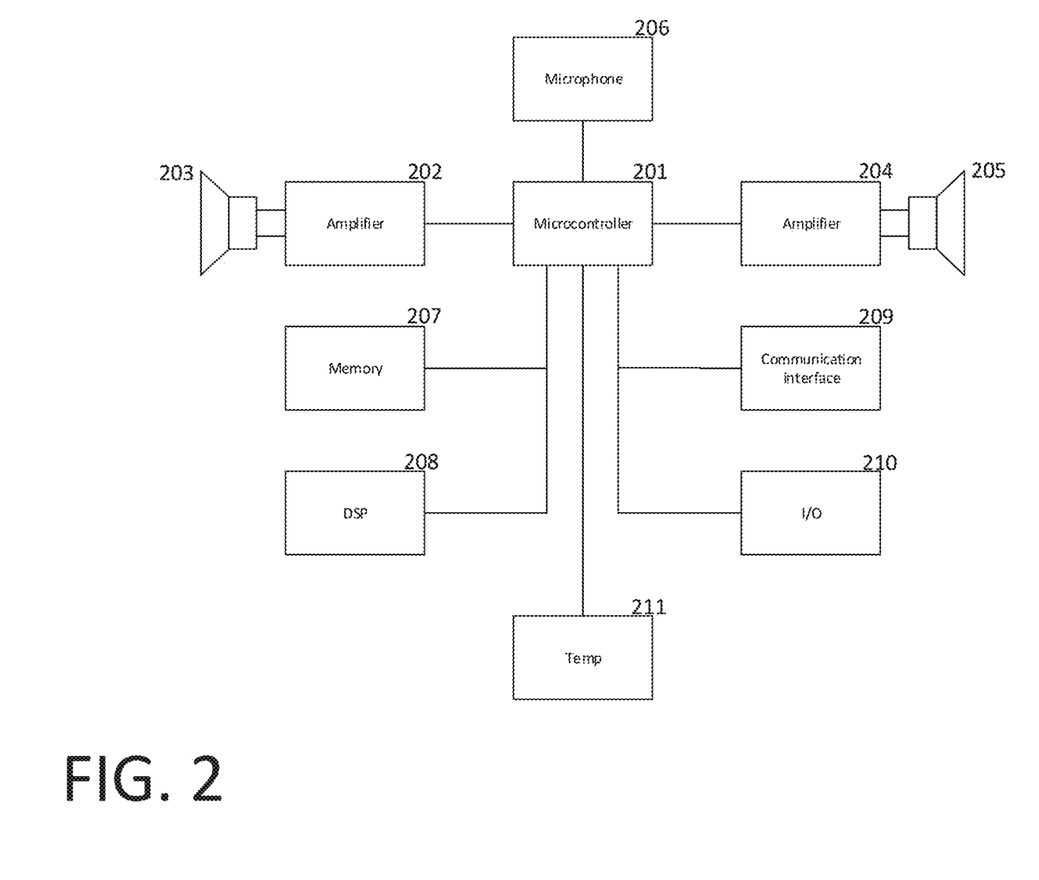
FIG. 2 is a block diagram of an embodiment of a node according to the invention.

Turning now to FIG. 2 an exemplary embodiment of a node will be described. The node includes a microcontroller 201, which is configured to control operation and calculations performed locally. The microcontroller controls a first amplifier 202 connected to a first speaker 203 as well as a second amplifier 204 connected to a second speaker 205. Physically the two speakers 203, 205 are facing in opposite directions, although in some embodiments it may be possible to change their direction somewhat in order to ensure that they face directly towards an adjacent node even if the adjacent nodes are not positioned in a straight line. This may, for example, be the case if the system is installed in a tunnel that is curving, or if some nodes are positioned on the opposite tunnel wall. An example of the latter is shown in FIG. 1 where node 105 is on the opposite wall from the other nodes and the speakers of nodes 104, 105 and 106 are therefore not facing in exact opposite directions.

The embodiment shown in FIG. 2 further includes a microphone 206, which is used during configuration, as will be described further below. A local memory 207, which may be a combination of random access memory (RAM) and non-volatile memory (e.g. flash memory).

The memory may hold instructions controlling the operation of the microcontroller, pre-recorded audio messages, as well as configuration data and log data. The configuration data may include pre-installed configuration ("factory settings"), user configuration parameter, and settings derived by the configuration process that will be described below.

Depending on the amount of calculations performed locally in the node and the processing power of the microcontroller 201, some embodiments of a node according to the invention may also include a digital signal processor (DSP) 208. The DSP may be used to perform calculations during configuration as will be described below.

A node may also include a communication interface 209, for example Ethernet, WiFi, or any other suitable wired or wireless communication capability, as well as input/output interfaces 210 including wired communication interfaces as well as user interface for receiving user input or displaying status or other operational information.

Finally, a node may include a temperature sensor 211, which can be used to make adjustments during configuration or synchronized playback based on how the speed of sound changes with air temperature. Embodiments may also include hygrometers and/or barometers in order to make similar adjustments for change in air humidity or atmospheric pressure.

Nodes as the one illustrated in FIG. 2 may be connected in sets to a terminal Power over Ethernet (PoE) Ethernet switch 114, for example with 8 nodes per switch. In tunnels, the switches 114 may be installed in emergency cabinets for example 80-140 m distance apart, and utilize any already present fiber optic network for digital communication. In other types of installations, e.g. in buildings or ships, the position of switches, number of nodes per switch etc. may differ. Nodes according to the invention may also be provided with local power supply, for example in the form of rechargeable batteries, and any other wired or wireless communication standard may be implemented in embodiments of the invention based on design criteria.

According to one embodiment, the nodes receive power as well as communication signals via a single Ethernet cable. Power standard of 802.3bt Ultra PoE (finalized in 2018) allows for a power budget of 60 Watt per node.

Although it is not inconsistent with the invention to enable centrally streamed audio, the nodes may primarily be configured to deliver pre-recorded audio effects and speech segments stored locally at each node.

Nodes can be installed by general electricians without special training. They may be installed at a height approximately level with a person's head or up to 1 or 2 meters higher. In an exemplary embodiments the speakers are installed at approximately 2.4 m height, and there are no strict requirements with respect to the distance between them. The distance may vary from 6-7 m up to 15-20 m depending on the application. If the units installed in tight, low noise corridors such as hotels or ships, or at lower heights bringing them closer to the listeners' ears, too long distances between the speakers may require a sound pressure level that will be uncomfortably high near the speakers. In such situations, power output may be reduced and compensated for by shorter distances between the speakers. Similarly, in high noise spots in tunnels, like near the exhaust fans, the speakers could be closer together. Once installed, a control system, installed on a PC either on or off site, will run a calibration program:

All nodes synchronize their local clocks with a precision time server stratum (NTP or IEEE 1588-2008 PTP) on-site. This ensures that the local clocks in the nodes are sufficiently synchronized to be used for calculation of sound propagation time between nodes.

Figure 3:
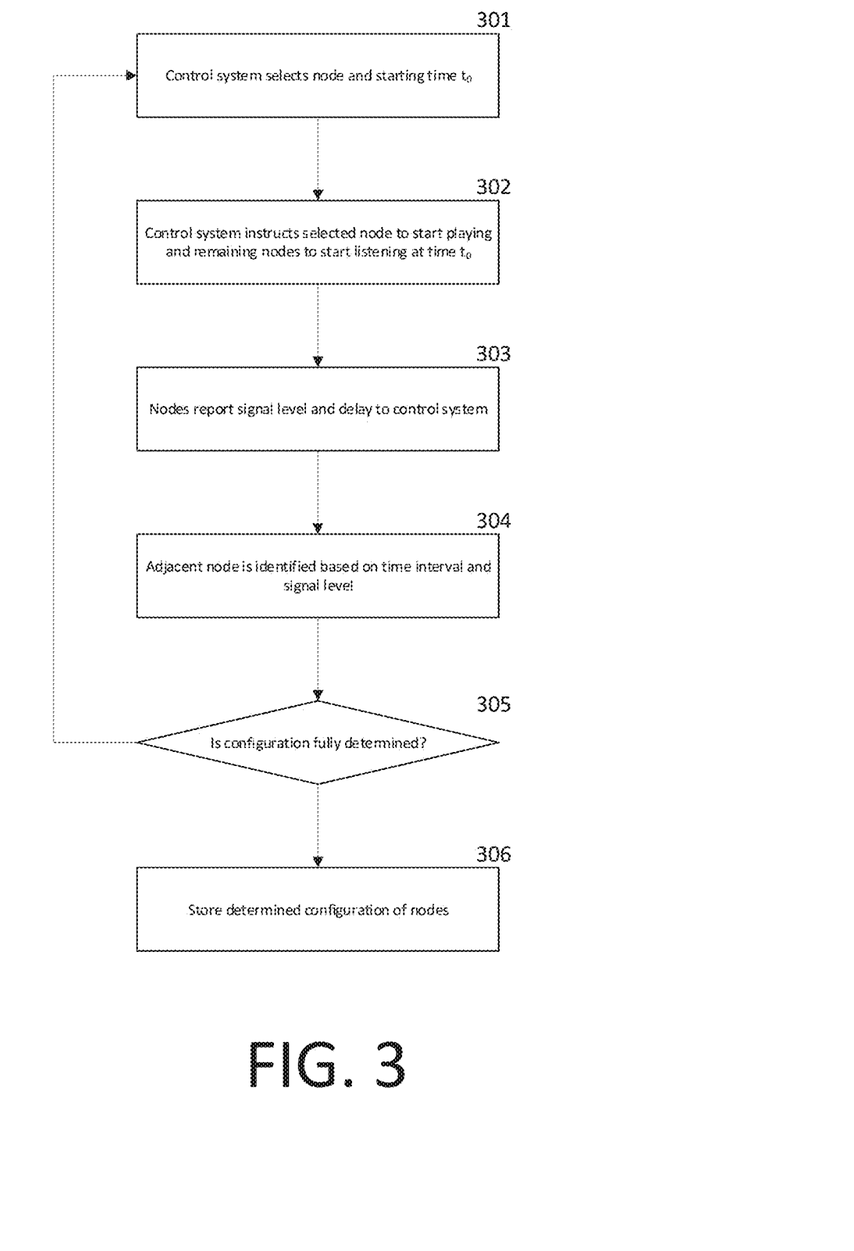
FIG. 3 is a flow chart illustrating an embodiment of a method for determining the relative position of nodes in a system according to the invention.

Reference is now made to FIG. 3 which is a flow chart illustrating a first phase of system configuration, where the relative position and direction of the nodes are determined.

As already mentioned, nodes according to the invention can be installed by personnel that do not have any special training. At most, some embodiments may require that the individual speakers be adjusted to adapt to changes in the direction of the pathway or point in the direction of an adjacent node. (It will be realized that the invention may be modified to include additional configuration steps to be performed by a specialist and that doing so does not in and of itself bring an embodiment outside the scope of the invention.)

In order to determine the relative positions of the nodes and the direction of their speakers, the control system 115 chooses a node arbitrarily and this node will play a sound through one of its speakers while the other nodes listen trying to detect this tone via microphones. The shortest time interval and highest signal level determines which node is adjacent. The process is repeated until the configuration of the entire system is determined.

Described in more detail, the process starts in a first step where the control system selects a node and a starting time t0. The selection of nodes can be sequential or arbitrary. The selection will typically also specify one of the two node speakers. Alternatively, the node selects a speaker at random.

In a next step the control system instructs the selected node to start playing a predetermined test sound and instructs the remaining nodes to start listening at time t0.

The listening nodes register the time $t1,n$ which is the time the signal was registered by the microphone at node n, and measures the signal level. The nodes report their respective registration times $t1,n$ or the calculated delay ($dn=t1,n-t0$) and the signal level to the control system in step 303 and the control system determines in step 304 which node is adjacent to the selected node in the direction of the selected speaker.

Since the purpose during this phase of configuration is simply to determine the relative position of the nodes to each other, and not to determine the exact distance between the nodes, it may be sufficient for the listening nodes to register t1 as the time the test sound is first registered. However, in some embodiments of the invention the listening nodes listen for a particular predefined signal feature that will occur at a specific time subsequent to the beginning of the test signal. This method will be described in further detail below as part of the method of determining the distance between adjacent nodes.

It is then determined in step 305 whether the relative positions of all nodes and the direction of their speakers are known. As long as this is not the case, the process will return to step 301 where a new node and a new starting time t0 is selected. If it is determined in step 305 that the configuration is fully determined with respect to the relative positions of the nodes (i.e. that it is known for each node which adjacent node its two speakers are facing), the process moves to step 306 where the configuration is stored in the control system. In some embodiments the configuration is also distributed to the nodes, in full or in part.

The criteria for determining, in step 305, that the system is completely mapped may vary in different embodiments. In some embodiments where the test signal is played sequentially or by randomly selected nodes but a node is never selected more than once, the stopping criteria will simply be that all speakers have played the test signal once, provided that there are no inconsistent results (e.g. results that are mutually exclusive). In other embodiments the sequence may be repeated or nodes may be selected randomly with a possibility of selecting the same node and speaker several times, the stopping criteria can be that the system is completely mapped and there are no inconsistent results, or that consistent results have been obtained repeatedly (e.g. that inconsistent results are outnumbered by some predefined ratio).

After the topology of the system has been determined, a second phase of the configuration is performed in order to determine the distance between adjacent nodes. An embodiment of this second phase is illustrated in the flowchart in FIG. 4.

Figure 4:
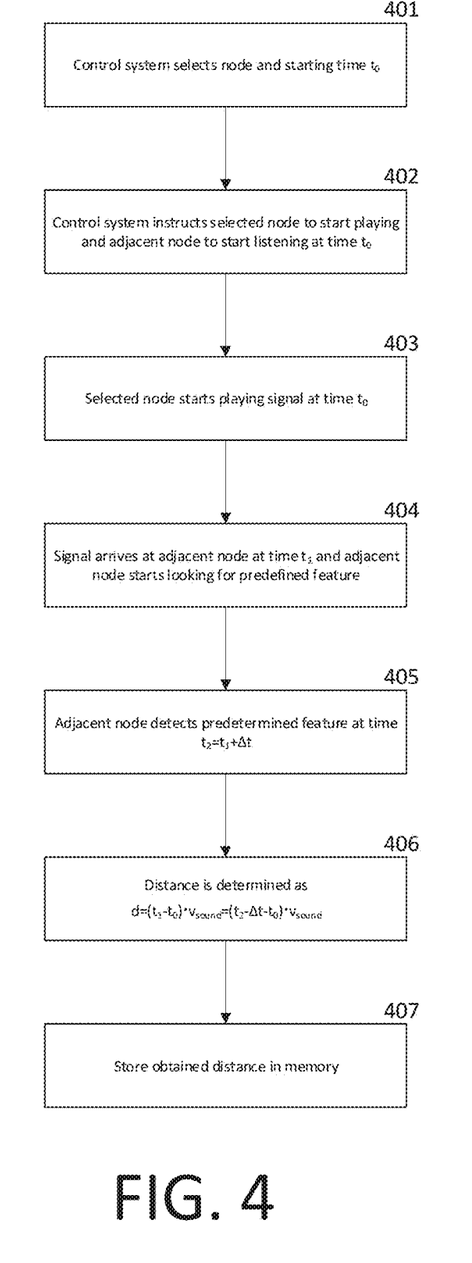
FIG. 4 is a flow chart illustrating an embodiment of a method for determining the distance between adjacent nodes in a system according to the invention.

In a first step 401 the control system selects a node and a starting time t0. Again the nodes may be selected sequentially or arbitrarily. The control system then instructs 402 the selected node to start playing a preselected test signal at starting time t0 through one of its speakers. The control system also instructs the adjacent node to start listening for the test sound. The listening node is provided with the start time t0.

It is practically challenging to detect sound wave arrival to microphone using naïve Fast Fourier Transform magnitude or Goertzel detectors, due to initial wave distortions and amplifier ramp-up. Therefore, a more sophisticated method may be used as will be described in further detail below.

When the preselected time t0 arrives, the selected node starts playing the test sound in step 403. The test sound may be an acoustic signal that includes a particular feature that occurs a predetermined time $\Delta t$ after the beginning of the signal. One way to achieve this is to use a signal that includes two frequencies that are not harmonic and the sum of which do not create any repeated pattern (the ratio between the two frequencies is an irrational number). A slightly looser criterion is to ensure that the period is very long, such that a given pattern will not be repeated during a normal configuration playback of the test sound. There are, of course, other ways to create well defined features that can be detected by the listening node, for example by using frequency or phase shift modulation patterns, frequency sweeps etc.

In step 404 the test signal arrives at the listening node. This happens at time t1 which, as described above, is not established directly. Instead, the node starts monitoring the signal in order to detect the predefined feature. The node may use the digital signal processor 208 to perform the required analysis necessary to detect the feature. The feature is detected in step 405 at time $t2=t1+\Delta t$. Since t2 and $\Delta t$ are known the node can now calculate t1, and since t0 is known the node can determine the propagation time for the acoustic signal to travel from the selected node to the listening node. The distance between the nodes can be determined in step 406 as $d=(t1-t0)\cdot vsound=(t2-\Delta t-t0)\cdot vsound$, where vsound is the speed of sound. In some embodiments the node includes one or more sensors to determine temperature 211, humidity or air pressure in order to adjust the speed of sound used in the calculation and thus obtain a more accurate calculation of the distance between the nodes.

In step 407 the distance between the nodes are stored in the node for use during synchronization, as will be described further below.

It is, of course, possible to store the determined propagation time instead of the distance. The propagation time can be thought of as a representation of the distance, since it is the distance and the speed of sound that determines propagation time. Consequently, any reference to either propagation time, delay time or distance as the value that is obtained during configuration or used during synchronization is intended to include direct storage of either one, the other or both, and also to include direct use of a stored value or calculation of the other value from the stored value.

The process described above is performed for all pairs of adjacent nodes. At the very least the process is performed once for each such pair. In some embodiments the process is performed in both directions, i.e. the roles of the selected node and the listening, adjacent node are reversed. The process may continue to perform measurements, for example according to a predetermined sequence or randomly, until some convergence criterion has been fulfilled. The convergence criterion may be that the measurement of t3 for all pairs of adjacent nodes has reached a certain stability in terms of a calculated mean or median value.

In the way described above, the system even on large installations should converge in a matter of hours without any operator input or on-site measurement. Once this is done, the system is ready to deliver synchronized sound in either direction.

It will be understood by those with skill in the art that the process of determining the topology of the system does not have to be completed before determination of distances commences. Rather, as soon as the identity of two adjacent speakers have been determined their distance can be determined before the process of determining adjacent speakers continues. As such, the process of identifying adjacent nodes and the process of measuring distances between adjacent nodes can be interleaved in any manner. In other words, at any time during configuration the sequence of steps involved in determining adjacent nodes may be performed, and at any time during configuration the sequence of steps involved in determining distance between adjacent nodes may be performed, irrespective of whether the other of the two processes have been completed or not. The only requirement is that the process of determining distances between nodes actually has available information identifying two adjacent nodes.

Figure 5:
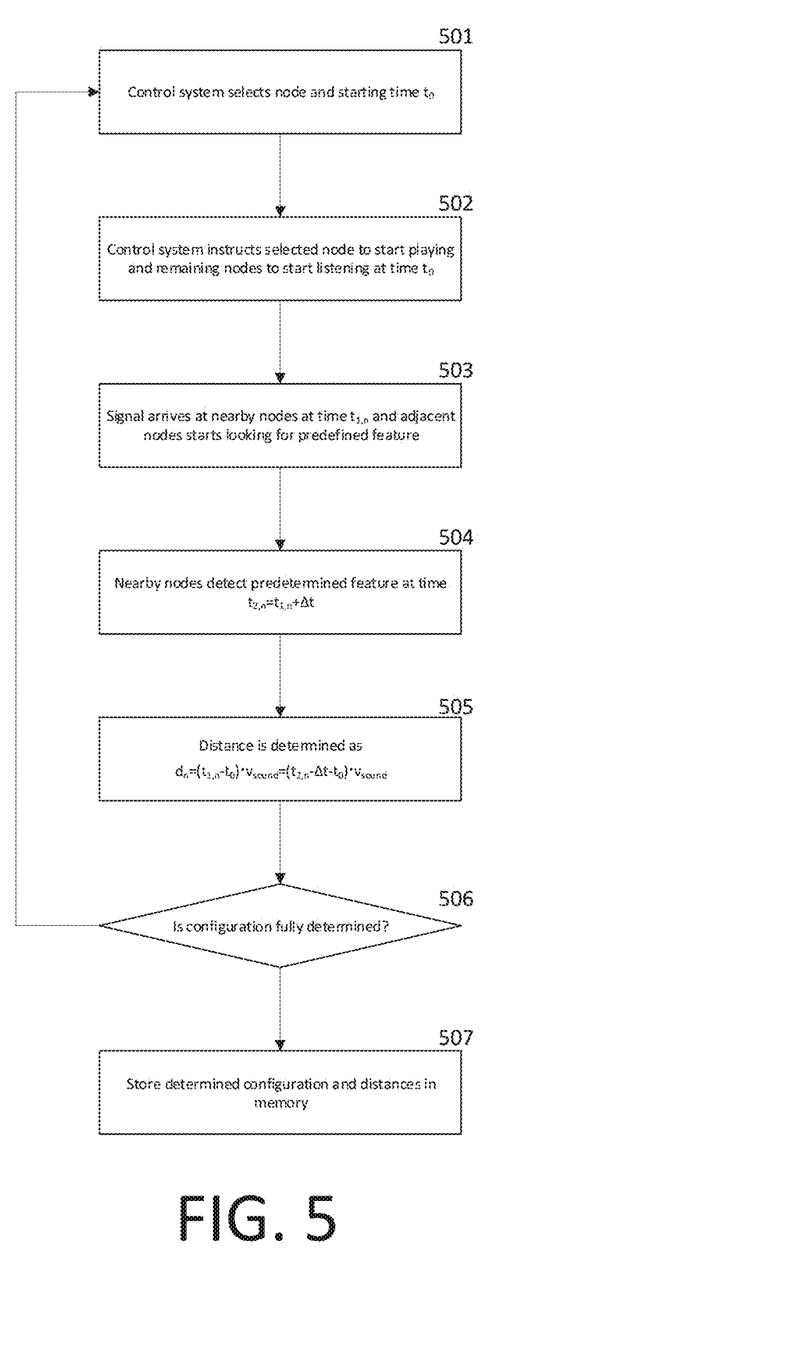
FIG. 5 is a flow chart illustrating an embodiment of a method for synchronizing playback of sound by nodes in a system according to the invention.

In a modification to the process described above, the processes are combined, as illustrated in FIG. 5. In a first step 501 the control system selects a node and a starting time t0. In a next step the control system instructs the selected node to start playing and remaining nodes to start listening at time t0. In this embodiment the test sound used here includes the predetermined pattern, or feature, that are used by listening nodes to determine exact arrival time for the test sound at the node.

In step 503 the test sound arrives at nearby nodes at time t1,n where n is a reference to a respective node. It will be realized that some of the nodes instructed to listen for the test sound may be too far away from the selected node to actually be able to detect the test sound and the feature. A nearby node is defined as a node that is able to detect the sound as well as the predefined feature.

In step 504 the nearby nodes detect the predetermined feature. For node n the time of detection is $t2,n=t1,n+\Delta t$, where $\Delta t$ is the position of the feature in the test sound. Since this is a feature of the known test signal, $\Delta t$ is known to the nodes. The arrival time for the test sound at node tn can therefore be determined as $t1,n=t2,n-\Delta t$.

Now that t0 is known and t1 is known the distance between the selected node and the respective nearby nodes can be calculated in step 505. In some embodiments this will be done in the nodes themselves and the distances will be reported to the control system computer 115. In other embodiments the nodes only report t1,n to the control system which computes the distance for the node with the lowest arrival time t1,n. In either case the control system determines which node is closest to the selected node and registers the identity and distance.

In step 506 it is determined whether the configuration is complete, i.e. that all adjacent pairs of nodes are identified and the distances between them have been measured. If not the process returns to step 501. If, however, configuration is complete the determined configuration and distances are stored in memory in step 507.

In addition to detection of relative position (topology) of the system nodes, and determination of the distance between adjacent nodes, the configuration process may include volume adjustments. The system must provide sufficient sound pressure at human height throughout the site. The microphones may provide information about detected sound level to the control system and the control system may determine necessary sound volume adjustments and potentially warn operator if some nodes are installed too far apart or if ambient noise, for example from fans, makes it necessary to increase the volume for that node.

After configuration is complete, the system is ready to become operational. During operation any given node will use one of its two speakers to play sound, and the sound will be played with a delay relative to the adjacent upstream node that corresponds to the propagation time for sound to travel to the node from the adjacent upstream node.

The term upstream node is used herein to refer to a node that plays sound through a speaker directed towards another node, and that other node is referred to as a downstream node. With reference to FIG. 1 node 103 is upstream with respect to node 102 and node 102 is downstream of node 103. Nodes that are facing towards each other, such as node 101 and node 102 (because they are on respective sides of an exit they are directing people towards) are not synchronized and are not considered upstream or downstream of each other.

In a situation where there are no dangers and an acoustic signal should be played throughout the area, the playback may simply start at one end and travel downstream towards the other end with the predetermined delay added for each speaker downstream of the first speaker. All nodes will then play sound through speakers facing in the same direction and with a delay relative to the adjacent upstream node determined by the distance between the two nodes.

The situation becomes another if the sound is intended to direct people towards the closest exit, while taking localized danger zones into consideration such that people are not directed towards danger. This is illustrated in FIG. 1 by the fire 113 and the way all nodes are using the speaker that faces the closest exit as long as the closest exit is not inaccessible because of the localized danger zone. For example, in FIG. 1 the closest exit to node 103 is exit 109, but exit 109 is inaccessible because of the fire 113. Consequently, node 103 is using the speaker facing towards node 102 and exit 108.

Figure 6:
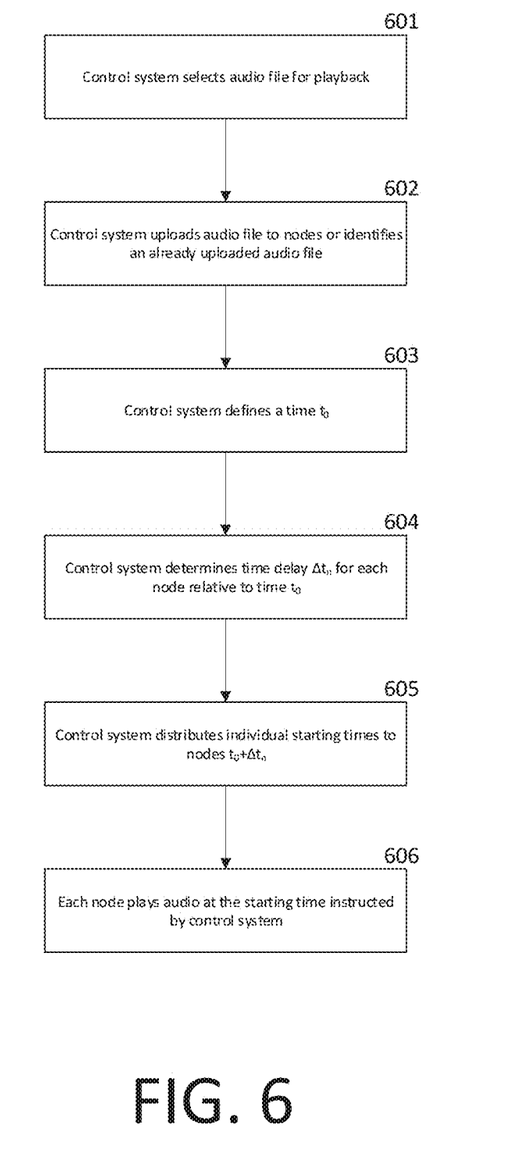
FIG. 6 is a flow chart illustrating certain details in an embodiment of a method for synchronizing playback of sound by nodes in a system according to the invention.

Reference is now made to FIG. 6 which shows an embodiment of a process that may be followed in order to initiate playback of an audio file by the respective nodes in a system according to the invention. It should be noted that the sequence of steps may be varied, and the only requirement with respect to sequence of steps is that information is actually available at a given node or at the control system if a step requires that the information is used by that node or by the control system. Otherwise, the sequence of steps may be changed.

In a first step 601 the control system selects an audio file for playback. The audio file may be a prerecorded spoken message, a spoken message just recorded by an operator, or a sound effect. The sound effect may be anything from a traditional alarm signal to a sound with a known psychoacoustic effect on listeners that is consistent with the intent behind the playing of the sound file.

If the sound file is not already present in local memory 207 in the nodes, the control system 115 may now upload the sound file to the nodes in step 602. If the sound file is already present on the nodes the control system 115 may simply identify the file to the nodes.

The control system may then, in step 603, define a starting point in time t0 at which playback of the audio file should start. In step 604 the control system determines time delay $\Delta t_n$ for each node n. If there are no emergencies present in the area and the sound is not intended to give information—directly or intuitively—about an escape route, the simplest is to start at one end and add the appropriate amount of delay for each node going downstream from the first node. So if the first node n=0 starts playing at time t0, and the delay between node n=0 and node n=1 is $\Delta t0,1$, node n=1 will start playing at time $t1=t0+\Delta t0,1$. If the delay between node n=1 and n=2 is $\Delta t1,2$ node n=2 will start playing at time $t2=t0+\Delta t0,1+\Delta t1,2$ and so on. The absolute delay for a node n thus becomes $$\Delta t_n = \sum_{i=0}^{n-1} \Delta t_{i,i+1}$$

where n is the number of the node counting from the first node n=0 and increasing by 1 for each adjacent node.

If the audio signal played by the nodes should indicate a direction, for example towards the closest available exit, an alternative approach is required. A default configuration can be established wherein it is determined which speaker each node shall use and the delay relative to t0 for each node. If, however, there are dangers in the area, such as fire 113 illustrated in FIG. 1, the default configuration must be modified to take into consideration the fact that a given exit that would normally be the closest exit from a particular node is inaccessible from that node.

Figure 7:
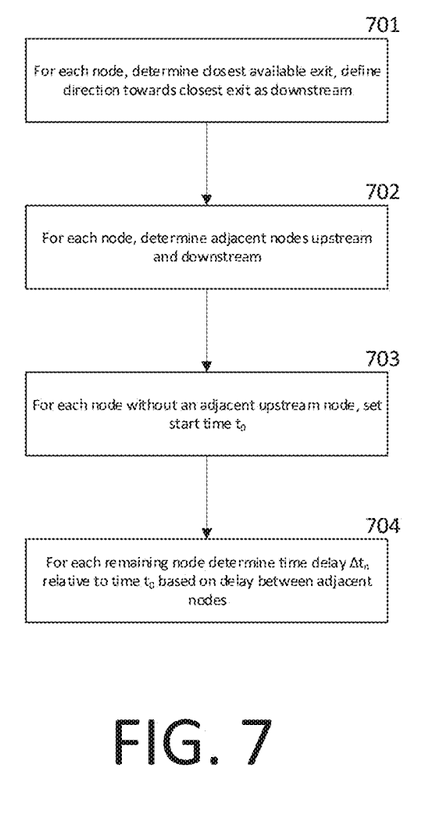
FIG. 7 is a flow chart illustrating certain details in an embodiment of a method for determining downstream direction and delay for nodes in a system according to the invention.

An example of a process that may be performed by the control system 115 in order to determine downstream direction and delay for nodes is illustrated in FIG. 7. According to this method, the control system 115 determines, in a first step 701, the closest available exit relative to each node. This determination can be based on information about the location of the nodes and of all exits, as already stored in the control system, and the addition of information from sensors regarding dangers such as fire. This determination also defines the downstream direction for each node (i.e. the direction towards the closest available exit).

In a following step 702 the control system 115 determines, for each node, the adjacent upstream and downstream node.

Some nodes will not have upstream nodes. For these nodes the playback start time is set to t0 in step 703. For each remaining node the time delay $\Delta t$ relative to t0 is determined in step 704. The delay for each node is the accumulated delay for each jump from one node to the next in the direction downstream from a node with t0 as starting time.

Some modifications that may be made to this process should be apparent. For example, the direction can be changed such that speakers facing away from the closest exit are the ones that are used such that people should move towards the source of the sound instead of away from it. This, of course, also means that the delay increases in the opposite direction.

Returning to FIG. 6, step 604 has now been completed, either based on a predetermined configuration or based on a determination which takes present conditions into consideration, for example such as blocked exits and inaccessible areas.

The control system can now distribute the individual starting times t0+Δtn to as well as the determined downstream direction (at least if it is different from a predefined default direction) to the respective nodes in step 605. The nodes will now start playing the audio file identified in step 602 as soon as their individually delayed starting times arrive in step 606.

As already mentioned the steps described above may be performed in a different sequence. For example, upload or identification of an audio file and distribution of individual starting times for playback may be part of the same transmission of data to the respective nodes. The method may also be modified with additional steps or actions. For example, if the nodes or the system as a whole includes sensors for temperature, humidity or air pressure, such data may be used to modify the delay times between adjacent pairs of nodes based on how the speed of sound depends on these parameters.

The example described above assumes that the system is configured to play pre-recorded audio files or audio files that are recorded just prior to being played back and subsequently uploaded to the nodes. As long as the control system 115 is connected to the nodes over an IP network and via switches 114, the propagation time for data from the control system to a node is too variable to allow synchronization between the nodes. Files that are uploaded before playback begins, however, can be played back at the exact moment determined by the control system 115. However, if the network connecting the control system and the nodes could be configured to ensure sufficiently low latency, if buffering and time stamps could guarantee that the delay in transfer from control system 115 to nodes were exactly the same for all nodes, or if audio is transferred over dedicated lines without latency, for example analog lines, the methods described above can be utilized for configuration and synchronization of PA systems that allow streaming of audio instead of or in addition to upload of audio files.

In addition to playback of spoken messages, the present invention may employ different sound effects or psychoacoustic effects to trigger an intuitive or even a physical response. One can easily think of sound effects producing strong intuitive response: hair-rising metal on glass or chalk on blackboard sounds, or head turning soothing harmonic jingles. According to the literature, these go deep into our limbic brain system and exhibit as early as in infancy (known then as Auditory Orienting Reflex). Some embodiments of the invention take advantage of this effect by using spatial sound delivery effects that can be followed by people intuitively. For example, a directional rolling sound that appears to be rolling towards the nearest exit may be combined with an escape-endorsing psychoacoustic effect.

What is claimed is:

1. A method for configuring a sound system in a confined passageway, comprising:
    installing a plurality of nodes with defined identities at intervals along the confined passageway, each node including a microphone and two loudspeakers directed in substantially opposite directions along the confined passageway;
    establishing communication between each of the nodes and a control system computer;
    instructing a selected node from the plurality of nodes to play a first test sound at a first point in time determined by the control system computer and instructing remaining nodes from the plurality of nodes to register the first test sound;
    determining an identity of nodes adjacent to the selected node in opposite directions along the confined passageway based on at least one of a time of registration of the first test sound at the remaining nodes and a sound level for the registered first test sound at the remaining nodes;
    repeating the steps of instructing a selected node from the plurality of nodes to play the first test sound and determining the identity of the nodes adjacent to the selected node for a new selected node until relative positions of all nodes of the plurality of nodes communicating with the control system computer have been determined;
    instructing a second selected node from the plurality of nodes to play a second test sound using a selected one of its two loudspeakers at a second point in time determined by the control system computer and instructing an adjacent node in the direction of the selected loudspeaker to register the second test sound, the second test sound including a predefined pattern at a predetermined time subsequent to a beginning of the second test sound;
    detecting the predefined pattern at a third point in time by the adjacent node instructed to register the second test sound, the beginning of the second test sound arriving at the adjacent node at a fourth point in time that precedes the third point in time;
    determining the fourth point in time based on a difference between the third point in time and the predetermined time;
    computing a distance between the second selected node instructed to play the second test sound and the adjacent node instructed to register the second test sound, the adjacent node computing the distance based on determining a difference between the second point in time and the fourth point in time, the distance associated with a propagation time for the predefined pattern to travel from the second selected node instructed to play the second test sound to the adjacent node instructed to register the second test sound;
    repeating the step of instructing a second selected node from the plurality of nodes to play the second test sound and an adjacent node to register the second test sound, the step of detecting a predefined pattern, and the step of computing a distance, until a distance has been determined for each pair of adjacent nodes of the plurality of nodes; and
    storing the relative positions of all nodes of the plurality of nodes and the computed distance between all adjacent nodes in the control system computer.

2. The method according to claim 1, wherein the second test sound is a sum of two sound signals with different frequencies that do not produce a repeated pattern or that only produce a repeated pattern after a time interval considerably longer than it takes to play the second test sound and detect the predefined pattern.

3. The method according to claim 2, wherein the confined passageway is selected from a group consisting of: a tunnel, a corridor in a building, and a corridor on a ship.

4. The method according to claim 1, wherein the confined passageway is selected from a group consisting of: a tunnel, a corridor in a building, and a corridor on a ship.

5. A method for configuring a sound system in a confined passageway, comprising:
    installing a plurality of nodes with defined identities at intervals along the confined passageway, each node including a microphone and two loudspeakers directed in substantially opposite directions along the confined passageway;

establishing communication between each of the nodes and a control system computer;

instructing a selected node from the plurality of nodes to play a test sound using a selected one of its two loudspeakers at a first point in time determined by the control system computer and instructing remaining nodes from the plurality of nodes to register the test sound, the test sound including a predefined pattern at a predetermined time subsequent to a beginning of the test sound;

detecting the predefined pattern at a second point in time by the remaining nodes instructed to register the test sound, the beginning of the test sound arriving at the remaining nodes, respectively, at a third point in time that precedes the second point in time;

for each node that has registered the test sound and detected the predefined pattern, computing a distance between the selected node instructed to play the test sound and the remaining nodes instructed to register the test sound, the respective node computing the distance based on determining a difference between the third point in time and the first point in time, the third point in time determined based on a second difference between the second point in time and the predetermined time, and the distance associated with a propagation time for the predefined pattern to travel from the selected node instructed to play the test sound to a remaining node of the remaining nodes instructed to register the test sound;

determining an identity of a node closest to the selected node based on the computed distances;

repeating the steps of instructing a selected node from the plurality of nodes to play the test sound and the remaining nodes to register the test sound, the step of detecting a predefined pattern, the step of computing a distance, and the step of determining an identity of a node closest to the selected node until a distance has been determined for each pair of adjacent nodes of the plurality of nodes; and storing relative positions of all nodes of the plurality of nodes and the computed distance between all adjacent nodes in the control system computer.

6. A node for use in a sound system in a confined passageway, comprising:

a microcontroller;

a local memory;

two loudspeakers directed in substantially opposite directions;

a microphone;

a communication interface;

wherein the local memory includes instructions which, when executed by the microcontroller, enable the node to:

(i) control playback of audio files over either one of the two loudspeakers;

(ii) register sounds using the microphone;

(iii) identify predetermined patterns in the registered sounds, a predetermined pattern occurring at a predetermined time subsequent to the beginning of a registered sound;

(iv) record points in time at which the predetermined patterns are registered;

(v) register sound levels for the registered sounds;

(vi) calculate a distance based on two points in time and a speed of sound, the two points in time including a first point in time and a second point in time, the first point in time associated with playing a sound by another node in the sound system, the second point in time associated with an arrival of the sound at the node, and the second point in time determined based on the predetermined time at which the predetermined pattern within the sound is identified;

(vii) receive instructions over the communications interface to start playback of the audio files at a defined point in time, start registering a received audio signal, determine points in time associated with an occurrence of an event, and perform the calculating of the distance; and (viii) upload any result of the registration of the received audio signal and the calculation of the distance to a remote control system computer.

7. The node according to claim 6, wherein the local memory is configured to hold pre-recorded audio files including sounds selected from a group consisting of: a periodic test sound, a non-periodic test sound with a predefined pattern, a spoken message, a sound creating an intuitive understanding of a message, and a sound creating a psychoacoustic reaction consistent with a message.

* * * * *